US012255487B2

(12) United States Patent
Otsuka et al.

(10) Patent No.: US 12,255,487 B2
(45) Date of Patent: Mar. 18, 2025

(54) FORCED DISCHARGE CONTROL SYSTEM FOR SMOOTHING CAPACITOR PROVIDED TO INVERTER

(71) Applicant: Mazda Motor Corporation, Hiroshima (JP)

(72) Inventors: Yuta Otsuka, Hiroshima (JP); Haruki Yamane, Hiroshima (JP); Takashi Yoshizaki, Hiroshima (JP); Shosuke Morimoto, Hiroshima (JP); Sho Kawanari, Hiroshima (JP); Hiroaki Kashihara, Hiroshima (JP); Yusuke Kame, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 36 days.

(21) Appl. No.: 18/126,580

(22) Filed: Mar. 27, 2023

(65) Prior Publication Data

US 2023/0387713 A1 Nov. 30, 2023

(30) Foreign Application Priority Data

May 31, 2022 (JP) .................................. 2022-088708

(51) Int. Cl.
*B60K 6/26* (2007.10)
*H01M 10/04* (2006.01)
(Continued)

(52) U.S. Cl.
CPC ................ *H02J 7/345* (2013.01); *B60K 6/26* (2013.01); *H01M 10/4264* (2013.01);
(Continued)

(58) Field of Classification Search
CPC .... H02J 7/345; H02J 7/00712; H02J 2310/48; B60K 6/26; H01M 10/4264; H01M 10/46; H01M 2220/20; B60Y 2200/92; B60L 3/0007; B60L 3/04; B60L 3/003; B60L 3/0046; B60L 3/0092; B60L 7/06;
(Continued)

(56) References Cited

U.S. PATENT DOCUMENTS

2013/0033914 A1* 2/2013 Yahata .................... H02M 7/48
363/132
2016/0303948 A1* 10/2016 Sakai .................... B60L 15/007

FOREIGN PATENT DOCUMENTS

JP 2012-205428 A 10/2012

OTHER PUBLICATIONS

Extended European search report issued on Oct. 4, 2023, in corresponding European patent Application No. 23164216.6, 12 pages.

* cited by examiner

*Primary Examiner* — Elim Ortiz
(74) *Attorney, Agent, or Firm* — XSENSUS LLP

(57) ABSTRACT

A smoothing capacitor is forcibly discharged, in a state where a battery is disconnected from a high-voltage circuit, first discharge control is initiated to consume electric charges of the smoothing capacitor by an in-vehicle component via a DC/DC converter. Thereafter, when a voltage of the smoothing capacitor is reduced and reaches a specified threshold, second discharge control is executed to forcibly discharge the electric charges in an active discharge circuit. In the case where continuous forced discharge occurs, delay control to delay execution timing of the second discharge control is further executed.

19 Claims, 11 Drawing Sheets

(51) Int. Cl.
*H01M 10/42* (2006.01)
*H01M 10/46* (2006.01)
*H01M 10/64* (2014.01)
*H02J 7/00* (2006.01)
*H02J 7/34* (2006.01)

(52) U.S. Cl.
CPC ......... *H01M 10/46* (2013.01); *H02J 7/00712* (2020.01); *B60Y 2200/92* (2013.01); *H01M 2220/20* (2013.01); *H02J 2310/48* (2020.01)

(58) Field of Classification Search
CPC .. B60L 7/14; B60L 50/10; B60L 50/51; B60L 50/60; B60L 50/40; B60L 53/20; H02M 1/322
See application file for complete search history.

<DURING ABNORMALITY OF DC/DC CONVERTER>

FORCED DISCHARGE CONTROL SYSTEM FOR SMOOTHING CAPACITOR PROVIDED TO INVERTER

CROSS-REFERENCE TO RELATED APPLICATION

The present application claims priority to Japanese Patent Application 2022-088708, filed May 31, 2022, the entire contents of which are incorporated herein by reference.

BACKGROUND

Field

The disclosed technique relates to a forced discharge control system for a smoothing capacitor provided to an in-vehicle inverter.

Description of the Related Art

In vehicles such as an electric vehicle and a hybrid vehicle, electric power of an in-vehicle high-voltage battery is controlled by an inverter and is then supplied to a motor. In this way, the motor is driven for travel. When a main switch of the vehicle is turned on, a high-voltage circuit, to which the inverter and the battery are connected, is brought into an energized state. Thereafter, when the main switch of the vehicle is turned off, the battery is disconnected from the high-voltage circuit in order to cancel the energized state.

The inverter is provided with a smoothing capacitor to smooth a current. When the inverter is brought into the energized state, the smoothing capacitor is applied with a voltage and stores electric charges. The electric charges remain in the smoothing capacitor even after the battery is disconnected from the high-voltage circuit. Thus, the voltage of the inverter is retained.

For this reason, when the main switch of the vehicle is turned off, it is necessary to promptly discharge the electric charges of the smoothing capacitor, and thus the vehicle is provided with such forced discharge means. The forced discharge means is desired to appropriately function not only when the main switch of the vehicle is turned off but also in the event of abnormality such as a collision of the vehicle.

An example of control related to such forced discharge is disclosed in Patent document 1. An inverter circuit disclosed in Patent document 1 is provided with a resistive forced discharge circuit (a forced discharge section).

More specifically, two resistors (a first resistor with a high resistance value and a second resistor with a low resistance value) for discharging the electric charges of the smoothing capacitor are installed in an electrical circuit of the inverter. It is controlled that the electric charges are first discharged only with the first resistor and, when the voltage of the smoothing capacitor becomes a specified voltage value or lower, the electric charges are further discharged even with the second resistor. In this way, the electric charges of the smoothing capacitor are promptly discharged.

PRIOR ART DOCUMENTS

Patent Documents

[Patent document 1] JP-A-2012-205428

SUMMARY

As in the inverter disclosed in Patent document 1, when the electric charges are discharged with the second resistor having the low resistance value, the voltage of the smoothing capacitor can promptly be reduced. However, since the large current flows through the second resistor, the second resistor generates heat, and a temperature thereof is increased rapidly. When the temperature of the second resistor is increased to a specified temperature or higher, the second resistor is damaged. Thus, an amount of the electric charges that can be discharged at once is limited.

In this regard, in the inverter disclosed in Patent document 1, the electric charges are discharged with the second resistor at the specified voltage value or lower, and the amount of the electric charges that can be discharged at once is thereby limited. However, in order to avoid the damage to the second resistor, the voltage value has to be set low. Meanwhile, since the first resistor is always connected, in a normal time, the high resistance value, at which the current hardly flows, has to be set for the first resistor. As a result, it takes time for discharge with the first resistor.

In addition, when the temperature of the second resistor becomes high, it takes time until the temperature thereof returns to an ambient temperature. Accordingly, when the discharge with the second resistor is repeated in a short time, the electric charges are discharged with the second resistor in a high-temperature state, and the second resistor is consequently damaged. As a result, a board has to be replaced.

The disclosed technique realizes a highly-reliable forced discharge control system capable of eliminating a defect as described above by using a device other than an inverter.

Means for Solving the Problem

The disclosed technique relates to a forced discharge control system for a smoothing capacitor.

The forced discharge control system includes: a drive battery that is mounted on a vehicle; an inverter that includes a smoothing capacitor and a forced discharge circuit thereof, controls electric power supplied from the battery, and outputs the controlled electric power to a drive motor; a step-down converter that steps down a voltage of the battery and supplies the stepped-down voltage to an in-vehicle low-voltage component; a high-voltage circuit that electrically connects the battery, the inverter, and the step-down converter; and power supply switching means capable of switching the battery to a state of being connected to the high-voltage circuit or a state of being disconnected from the high-voltage circuit.

The forced discharge circuit has an active discharge circuit that includes a main resistor and energization switching means. The main resistor is arranged in parallel with the smoothing capacitor. The energization switching means can switch the main resistor to a state of being connected to the high-voltage circuit or a state of being disconnected from the high-voltage circuit.

The forced discharge control system further includes a controller that controls the step-down converter, the power supply switching means, and the energization switching means.

When a specified forced discharge condition for forcibly discharging the smoothing capacitor is satisfied, in a state where the battery is disconnected from the high-voltage circuit by control by the power supply switching means, the controller initiates first discharge control to consume electric charges stored in the smoothing capacitor by the low-voltage component via the step-down converter.

Thereafter, when a voltage of the smoothing capacitor is reduced and reaches a specified threshold, the controller executes second discharge control to forcibly discharge the electric charges of the smoothing capacitor in an active discharge circuit by control by the energization switching means.

Furthermore, together with those, in the case where continuous forced discharge, in which the forced discharge condition is satisfied, occurs before a lapse of a specified time, the controller executes delay control to delay execution timing of the second discharge control.

In other words, according to this forced discharge control system, the step-down converter is also connected to the high-voltage circuit to which the inverter, which is supplied with the electric power from the drive battery and outputs high-voltage power to the motor, is connected. In addition, the inverter is also provided with the forced discharge circuit that includes the main resistor in order to promptly reduce the residual electric charges of the smoothing capacitor provided to the inverter, that is, to forcibly discharge the residual electric charges at the time when the battery is disconnected from the high-voltage circuit.

In a situation of forced discharge, the controller uses not only the forced discharge circuit but also the step-down converter. That is, the controller executes the forced discharge by concurrently using the first discharge control, in which the electric charges are consumed by the low-voltage component, by using the step-down converter and the second discharge control by using the forced discharge circuit. Therefore, it is possible to promptly reduce the electric charges of the smoothing capacitor.

At the time, prior to the second discharge control, the first discharge control is initiated. In this way, since it is possible to reduce a discharge amount in the active discharge circuit, a temperature increase of the main resistor is suppressed. Therefore, it is possible to suppress damage to the main resistor.

However, the step-down converter can no longer be actuated when the voltage of the smoothing capacitor reaches a specified voltage. Thus, the forced discharge in the active discharge circuit is only executed thereafter. The temperature increase of the main resistor is inevitable. In order to promptly reduce the electric charges of the smoothing capacitor, it is preferred to maximize use of the forced discharge in the active discharge circuit.

In such a case, when the forced discharge is repeatedly executed in a short time, the forced discharge is executed in a high-temperature state caused by accumulation of heat, and the main resistor is damaged. To handle such a problem, in this forced discharge control system, in the case where the continuous forced discharge occurs, the delay control to delay the execution timing of the second discharge control is executed.

In this way, a time from termination of the last forced discharge to initiation of the forced discharge in the active discharge circuit is increased. As a result, since it is possible to suppress repetition of the forced discharge in an extremely short time, it is possible to avoid an excessive temperature increase of the main resistor. Since a time for cooling the main resistor is increased, it is possible to reduce the temperature of the main resistor at the time of initiating the discharge. Thus, even in the case where the continuous forced discharge occurs, damage to the main resistor can be suppressed. Therefore, reliability of the forced discharge control system is improved.

In the forced discharge control system, the delay control may be executed in the case where the continuous forced discharge repeatedly occurs for specified number of times or more.

It has been confirmed that, even when the temperature of the main resistor is increased, the main resistor is not damaged with a certain level of temperature increase. Accordingly, there is no problem that the continuous forced discharge repeatedly occurs plural times at a short interval as long as the number of times is less than the specified number of times. Since the delay control is not executed, the smoothing capacitor can forcibly be discharged in the short time.

Meanwhile, the delay control is executed in the case where the continuous forced discharge repeatedly occurs specified number of times or more. In this way, it is possible to reduce the excessive temperature increase of the main resistor. Therefore, it is possible to suppress the damage to the main resistor.

In the forced discharge control system, in the case where the controller detects abnormality of the step-down converter, the controller may execute the second discharge control before the voltage of the smoothing capacitor reaches the threshold.

In the case where the step-down converter is abnormal, the electric charges of the smoothing capacitor cannot be consumed by the low-voltage component even when the first discharge control is executed. Thus, it is impossible to promptly reduce the voltage of the smoothing capacitor to the threshold. Meanwhile, in the case where the second discharge control is executed before the voltage of the smoothing capacitor reaches the threshold, the electric charges of the smoothing capacitor can promptly and forcibly be discharged by the active discharge circuit.

Also, in the case in which the step-down converter is abnormal, the smoothing capacitor can forcibly be discharged. Therefore, the reliability of the forced discharge control system is improved.

In the case where the inverter further includes a cooling mechanism that cools the inverter by circulating a coolant, the controller may execute the delay control when a temperature of the coolant exceeds a specified upper limit value or when abnormality of the cooling mechanism is detected.

Also, in such a case, the temperature of the inverter becomes abnormally high. Thus, the forced discharge is initiated in a state where the temperature of the main resistor is high. As a result, the main resistor is damaged when the forced discharge is executed as is. Meanwhile, the temperature increase of the main resistor can be suppressed by executing the delay control in such a case. Therefore, it is possible to suppress the damage to the main resistor.

Also, in the case where abnormality occurs to cooling of the step-down converter, the smoothing capacitor can appropriately and forcibly be discharged. Therefore, the reliability of the forced discharge control system is improved.

In the forced discharge control system, the forced discharge circuit may further have a passive discharge circuit that includes a sub-resistor. The sub-resistor is always connected to the smoothing capacitor and has a higher resistance value than the main resistor.

In such a case, although it takes time, the electric charges of the smoothing capacitor can be discharged by the passive discharge circuit when the forced discharge by the active discharge circuit or the like can no longer be executed due to a certain trouble. Accordingly, since the forced discharge control system functions as a so-called fail-safe system, the reliability of the forced discharge control system can further be improved.

In the forced discharge control system, the first discharge control and the second discharge control may be executed concurrently by maintaining the first discharge control even after the voltage of the smoothing capacitor reaches the threshold.

In this way, two types of the forced discharge are executed concurrently. Therefore, it is possible to reduce the electric charges of the smoothing capacitor in the shorter time. In addition, since the discharge amount by the active discharge circuit can be reduced, it is possible to suppress the damage to the main resistor.

In the forced discharge control system, in the case where the step-down converter is configured to be actuated at a specified actuation limit voltage, which is lower than the threshold, or higher, the first discharge control may be terminated when the voltage of the smoothing capacitor reaches the actuation limit voltage.

In such a case, the electric charges of the smoothing capacitor are discharged by the consumption in the low-voltage component to such a limit that the step-down converter can be used. Thus, the discharge amount by the active discharge circuit can effectively be reduced. Therefore, it is possible to further suppress the damage to the main resistor.

The forced discharge control system is particularly effective in the case where an engine is installed in a front portion of the vehicle and, in a state of being coupled to a rear portion of the engine, the drive motor is arranged in a tunnel section of a floor panel.

As means for forcibly discharging the smoothing capacitor, a method by d-axis discharge using the motor is also available. However, in such a method, a rotation angle of the motor has to be detected with a high degree of accuracy. Thus, in an arrangement structure as described above, a sensor may be damaged, which makes it difficult to execute the forced discharge, in the event of a vehicle collision or the like.

Meanwhile, even in the case where the collision of the vehicle having the arrangement structure as described above or the like occurs, the forced discharge by the active discharge circuit can be executed unless the inverter is damaged. Therefore, the forced discharge control system has the excellent reliability.

Advantages

According to the forced discharge control system, to which the disclosed technique is applied, the smoothing capacitor can effectively and forcibly be discharged by using the resistive forced discharge circuit without damaging the resistor. Therefore, it is possible to improve the reliability of the forced discharge control system.

DETAILED DESCRIPTION

A description will hereinafter be made on the disclosed technique.

However, the following description is essentially and merely illustrative.

<Vehicle>

Figure 1:
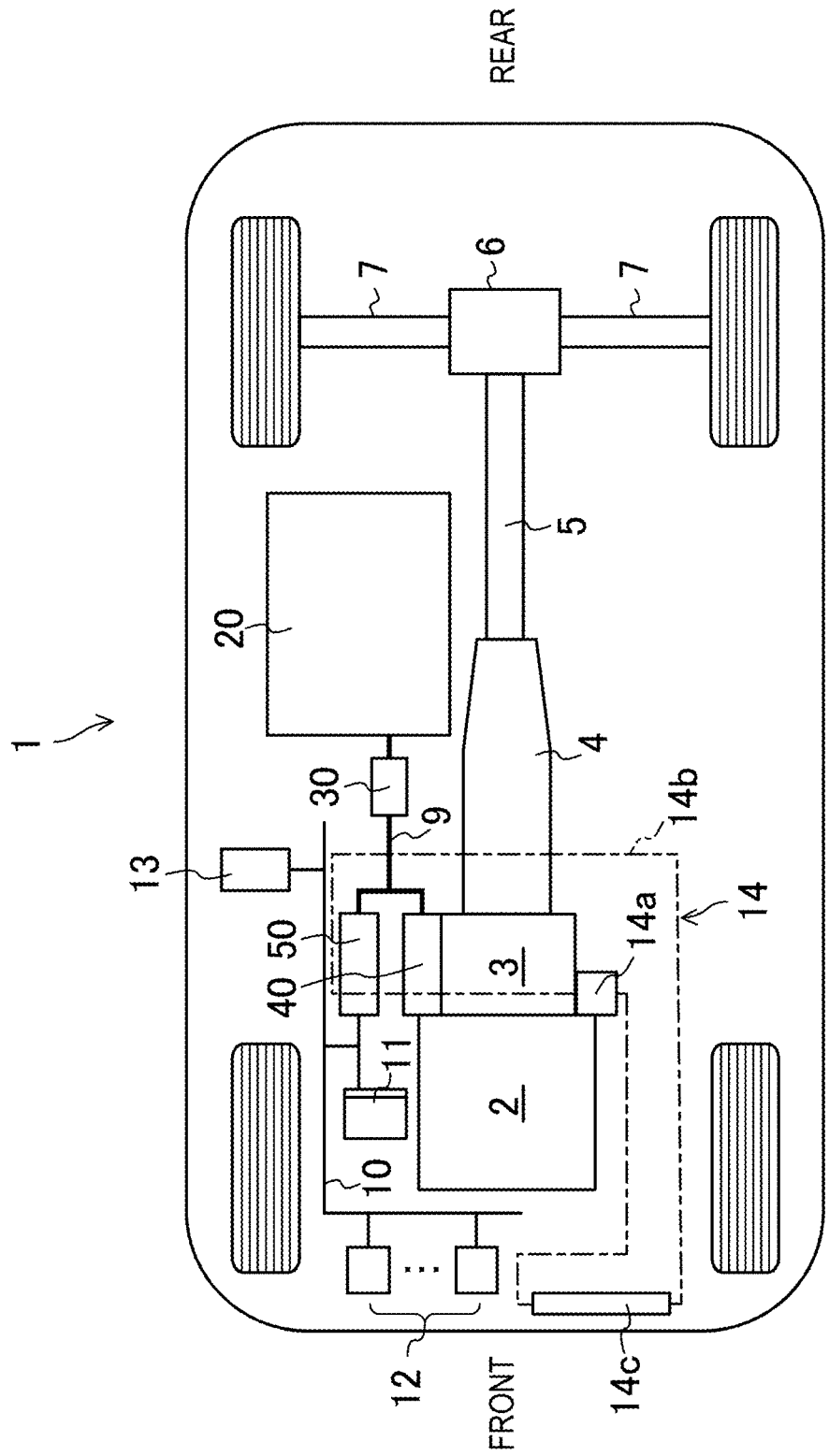
FIG. 1 is a schematic view illustrating a structure of an automobile to which the disclosed technique is applied.

FIG. 1 illustrates an automobile 1 (an example of the vehicle) to which the disclosed technique is applied. This automobile 1 is a hybrid vehicle that can travel by using electric power. The automobile 1 may be a so-called plug-in hybrid vehicle that is mounted with a power feeding device capable of supplying the electric power from a specified external power supply.

As drive sources of the automobile 1, an engine 2 and a drive motor 3 are mounted thereon. These work cooperatively to drive two rear wheels. In this way, the automobile 1 travels. In other words, this automobile 1 travels by using output of one of the engine 2 or the drive motor 3 or the output of both of the drive motor 3 and the engine 2.

In a case of this automobile 1, the engine 2 is arranged in a front portion thereof. That is, this automobile 1 is a so-called FR vehicle. However, the automobile 1 is not limited to the FR vehicle and may be a four-wheel-drive vehicle.

The engine 2 is an internal combustion engine that uses gasoline as fuel and burns the gasoline, for example. In addition, the engine 2 generates rotary power by repeating each of cycles including intake, compression, combustion, and exhaust (a so-called four-stroke engine). Various types and configurations of the engine 2, such as a diesel engine, are available, and the type and the configuration of the engine are not particularly limited in the disclosed technique.

In this automobile 1, in a state where a rotary shaft (a crankshaft) of the engine 2 faces a longitudinal direction of a vehicle body, the engine 2 is arranged in a substantially central portion of an engine compartment in a vehicle width direction. In the automobile 1, various devices and mechanisms associated with the engine 2, such as an intake system, an exhaust system, and a fuel supply system, are installed. However, these components will not be described.

The drive motor 3 is a synchronous motor of a permanent magnet type that is driven by a three-phase AC. The drive motor 3 is coupled to a rear portion of the engine 2 via a clutch in a state where the rotary shafts thereof are aligned. An automatic transmission 4 is coupled to a rear portion of the drive motor 3 in a state where the rotary shafts thereof are aligned.

The automatic transmission 4 is a multistage automatic transmission (a so-called AT). The automatic transmission 4 is coupled to a differential gear 6 via a propeller shaft 5 that extends in the longitudinal direction of the vehicle body. In a floor panel that covers a lower portion of the vehicle body, a tunnel section that is recessed upward and has a U-shaped cross section is formed to extend rearward from the engine compartment. In the case of this automobile 1, the drive motor 3, the automatic transmission 4, and the propeller shaft 5 are arranged in the tunnel section.

A pair of shafts 7 and 7 extend in a right-left direction from the differential gear 6. Rear wheel is assembled to an end portion of each of these shafts 7 and 7. In this way, the rotary power that is output from the engine 2 and the drive motor 3 is shifted by the automatic transmission 4, is thereafter divided to the right and the left by the differential gear 6, and is transmitted to the rear wheels.

As electrical devices in a high-voltage system, in addition to the drive motor 3, a drive battery 20, a contactor 30 (power supply switching means), an inverter 40, a DC/DC converter 50 (a step-down converter), and the like are mounted on the automobile 1. These electrical devices are connected via a high-voltage circuit 9 having a cable, a bus bar, and the like that are compatible with a large current. The electrical circuit of these electrical devices will separately be described below.

This automobile 1 is mounted with the high-voltage battery 20 whose rated voltage is 300 V or higher. A battery whose rated voltage is approximately 50 V may be mounted (so-called mild hybrid).

The battery 20 is connected to the high-voltage circuit 9 via the contactor 30. The contactor 30 switches the battery 20 to a state of being connected to the high-voltage circuit 9 or a state of being electrically and physically disconnected from the high-voltage circuit 9. When the connection state of the battery 20 is switched by the contactor 30, the electric power can be supplied from the battery 20 to the inverter 40 and the DC/DC converter 50.

An output side of the DC/DC converter 50 is connected to a low-voltage circuit 10 having a low-voltage cable, a controller area network (CAN), and the like. The DC/DC converter 50 steps down 300-V DC power, which is supplied from the battery 20, to 12-V DC power, and outputs the 12-V DC power to the low-voltage circuit 10.

In addition to the low-voltage battery 11 (a so-called lead-acid battery) whose rated voltage is approximately 12 V, in-vehicle components 12 (low-voltage components) are connected to the low-voltage circuit 10. Examples of the in-vehicle components 12 are: various electrical devices, such as an air conditioner, an electric pump 14a described below, and a headlight, that are mounted on the automobile 1; and a controller mounted on the automobile 1. The DC power, which has been stepped down by the DC/DC converter is supplied to these in-vehicle components 12 via the low-voltage circuit 10.

A power control module (PCM) 13 is mounted as the controller on the automobile 1. The PCM 13 comprehensively controls each device in a drive system that is mounted on the automobile 1, and the devices are the engine 2, the contactor 30, the inverter 40, the DC/DC converter 50, and the like. For example, in the case of this automobile 1, the PCM 13 executes control related to forced discharge of a smoothing capacitor 42, which will be described below.

The inverter 40 is a device that controls operation of the drive motor 3, and is installed near the drive motor 3. The inverter 40 controls the DC power that is supplied from the battery 20, and outputs the controlled DC power to the drive motor 3. Each of the drive motor 3, the inverter 40, and the DC/DC converter 50 generates heat when being actuated. For this reason, a cooling system 14 of a water-cooling type (a cooling mechanism) is attached to these.

As illustrated in a simplified manner in FIG. 1, the cooling system 14 is configured to include the electric pump 14a, a coolant passage 14b, a heat exchanger 14c for cooling a coolant by heat exchange with outside air, and the like. When the electric pump 14a is actuated and circularly supplies the coolant, which is cooled by the heat exchanger 14c, to the inverter 40 and the like via the coolant passage 14b, the inverter 40 and the like are cooled.

<Electrical Circuits of Contactor 30, Inverter 40, and DC/DC converter 50>

Figure 2:
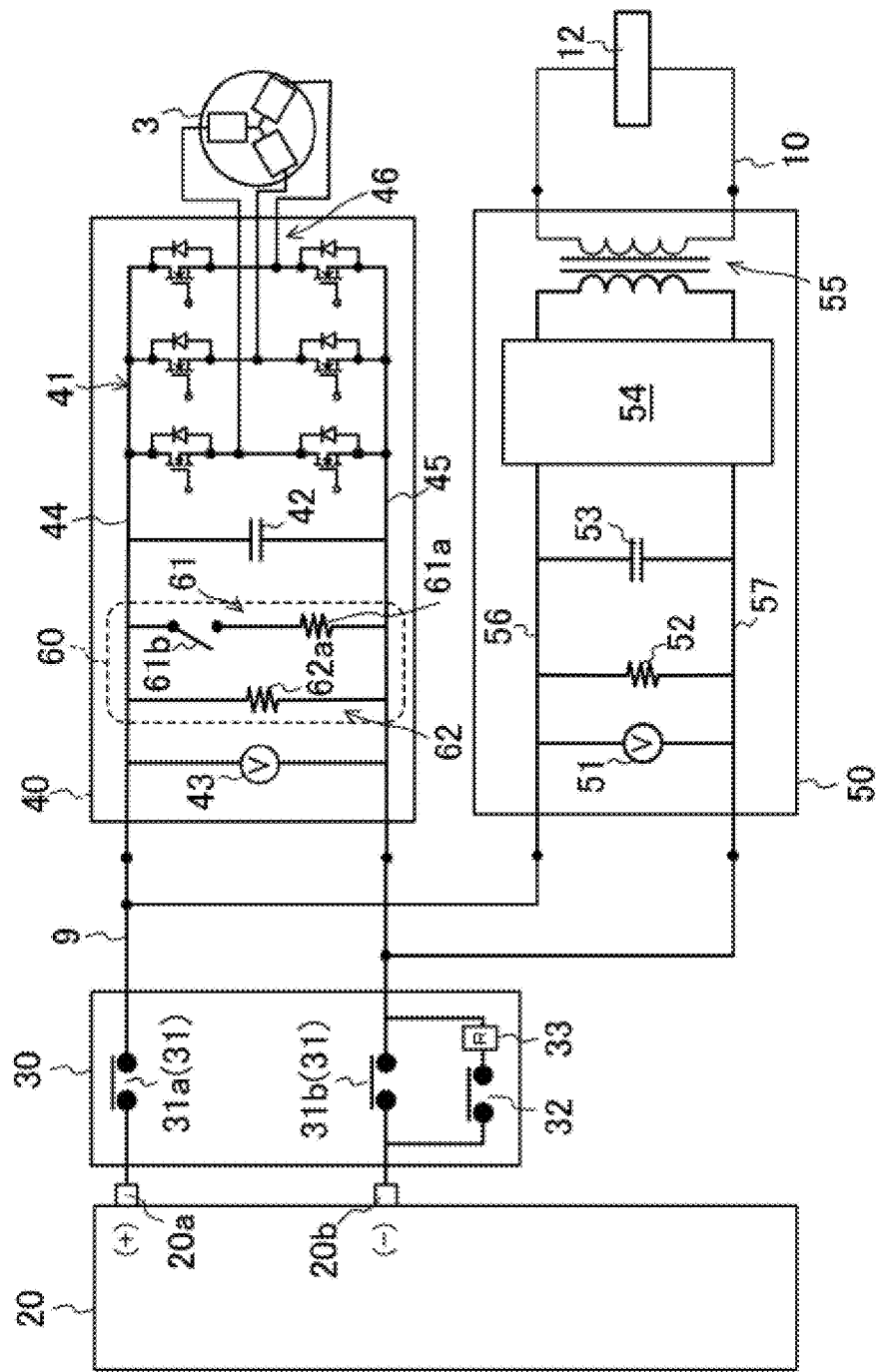
FIG. 2 is a schematic view illustrating an electrical circuit of main electrical devices in a high-voltage system.

FIG. 2 schematically illustrates an electrical circuit that is provided to each of the contactor 30, the inverter and the DC/DC converter 50 constituting the electrical circuit of the high-voltage system.

(Contactor 30)

The contactor 30 has: a main contactor 31 including a positive electrode contactor 31a and a negative electrode contactor 31b; and a pre-charge contactor 32. The positive electrode contactor 31a is connected to a positive electrode terminal 20a of the battery 20. The negative electrode contactor 31b is connected to a negative electrode terminal of the battery 20. In a parallel state with the negative electrode contactor 31b, together with a specified pre-charge resistor 33, the pre-charge contactor 32 is connected to the negative electrode terminal 20b of the battery 20.

The main contactor 31 switches the battery 20 to the state of being connected to the high-voltage circuit 9 or the state of being electrically and physically disconnected from the high-voltage circuit 9. However, the positive electrode contactor 31a may not be provided, and the main contactor 31 may be configured to only include the negative electrode contactor 31b. The pre-charge contactor 32 is installed to prevent welding of the main contactor 31, which is caused by the large current.

Specifically, the pre-charge contactor 32 is connected to the high-voltage circuit 9 after the positive electrode contactor 31a is connected to the high-voltage circuit 9 and before the negative electrode contactor 31b is connected to the high-voltage circuit 9. In this way, a voltage of the high-voltage circuit 9 is increased with the small current. Since the negative electrode contactor 31b is connected thereafter, it is possible to suppress the large current. The actuation of such a contactor 30 is controlled by the PCM 13.

More specifically, when accepting a request to turn on a main power supply of the automobile 1, the PCM 13 controls the contactor 30 and connects the battery 20 to the high-voltage circuit 9. Meanwhile, when accepting a request to turn off the main power supply of the automobile 1, the PCM 13 controls the contactor 30 and disconnects the battery 20 from the high-voltage circuit 9.

For example, when an ignition is turned on by a key operation or the like, the PCM 13 controls the contactor 30 in an interlocking manner therewith and connects the battery to the high-voltage circuit 9. Then, when the ignition is turned off, the PCM 13 controls the contactor 30 and disconnects the battery 20 from the high-voltage circuit 9.

In addition, for example, in the case where the automobile 1 has a function to remotely operate the air conditioner, by the remote operation, the PCM 13 controls the contactor 30 and connects the battery 20 to the high-voltage circuit 9. Then, when a specified condition is satisfied, the PCM 13 controls the contactor 30 and disconnects the battery 20 from the high-voltage circuit 9.

Furthermore, for example, in the case where the automobile 1 is the plug-in hybrid vehicle, at initiation of the electric power supply from an external power supply, the PCM 13 controls the contactor 30 and disconnects the battery from the high-voltage circuit 9. Then, when the electric power supply is terminated, the PCM 13 controls the contactor and connects the battery 20 to the high-voltage circuit 9.

(Inverter 40)

The inverter 40 has a specified switching circuit 41 including plural switching elements, the smoothing capacitor 42, a forced discharge circuit 60, and a voltmeter 43. The inverter 40 is provided with: a positive electrode side main wire 44 that is connected to a positive electrode side of the high-voltage circuit 9; and a negative electrode side main wire 45 that is connected to a negative electrode side of the high-voltage circuit 9.

The switching circuit 41, the smoothing capacitor 42, the forced discharge circuit 60, and the voltmeter 43 are connected in parallel between the positive electrode side main wire 44 and the negative electrode side main wire 45. In detail, the voltmeter 43, the forced discharge circuit the smoothing capacitor 42, and the switching circuit 41 are arranged in this order from an input side toward an output side of the inverter 40. The switching circuit 41 is connected to the drive motor 3 via an output wire 46.

The actuation of the inverter 40 is controlled by the PCM 13. More specifically, in an on state of the main power supply of the automobile 1, the PCM 13 controls the switching circuit 41 according to a driving state of the automobile 1. In this way, the inverter 40 converts the DC power, which is input from the high-voltage circuit 9, into the three-phase AC, and outputs the three-phase AC to the drive motor 3.

The smoothing capacitor 42 smooths the DC power that is input to the inverter 40. More specifically, when the main power supply of the automobile 1 is turned on, a voltage of the battery 20 is applied to the smoothing capacitor 42. Consequently, electric charges that correspond to the voltage are stored in the smoothing capacitor 42. The smooth capacitor 42 discharges the electric charges when the voltage is reduced, and stores the electric charges when the voltage is increased. Accordingly, the voltage between the positive electrode side main wire 44 and the negative electrode side main wire 45 is smoothed by the smoothing capacitor 42.

When the main power supply is turned off, the electric power is no longer supplied from the battery 20 to the inverter 40. However, since the electric charges remain in the smoothing capacitor 42, due to the residual electric charges, the high voltage between the positive electrode side main wire 44 and the negative electrode side main wire 45 is retained. Thus, it is necessary to promptly discharge the electric charges of the smoothing capacitor 42. For this reason, in this automobile 1, the inverter 40 is provided with the forced discharge circuit 60 as means for forcibly discharging the smoothing capacitor 42.

An example of the means for forcibly discharging the smoothing capacitor is a method for consuming the residual electric charges as the heat by using the motor (d-axis discharge). More specifically, a sensor such as a resolver detects a rotation angle of a rotor, and the inverter is controlled such that a magnetic flux is directed in a d-axis direction in which the motor does not rotate. In such a state, the current is made to flow through the motor. As a result, the residual electric charges can be consumed by heat generation of a stator coil without affecting driving of the motor.

In this automobile 1, however, the drive motor 3 is coupled to the rear portion of the engine 2 that is arranged in the front portion of the vehicle body. Furthermore, the drive motor 3 is arranged in the narrow tunnel section of the floor panel. Thus, in the event of a frontal collision of the automobile 1 or the like, the sensor, such as the resolver, that is attached to the drive motor 3 possibly fails.

Detection of the rotation angle of the rotor is presupposed in this method using d-axis discharge. Thus, in such a case, the smoothing capacitor cannot forcibly be discharged. For this reason, this automobile 1 is provided with a forced discharge circuit 60.

The forced discharge circuit 60 has an active discharge circuit 61 and a passive discharge circuit 62. The active discharge circuit 61 includes a main resistor 61a and a switch 61b (energization switching means) that are arranged in parallel with the smoothing capacitor 42. The passive discharge circuit 62 includes a sub-resistor 62a that is always connected in parallel with the smoothing capacitor 42. The switch 61b switches the main resistor 61a to a state of being connected to the forced discharge circuit 60 or a state of being disconnected from the forced discharge circuit 60.

The main resistor 61a has low resistance (for example, 50 ohm or higher and 200 ohm or lower) so as to allow a flow of the relatively large current. In contrast, the sub-resistor 62a has an extremely higher resistance value than the main resistor 61a (for example, 100K ohm or higher and 200 K ohm or lower) so as to obstruct the current flow. The resistance value of the sub-resistor 62a is at least 500 times higher than that of the main resistor 61a.

The voltmeter 43 measures the voltage that is input to the inverter 40, in other words, the voltage between the positive electrode side main wire 44 and the negative electrode side main wire 45 (corresponding to the voltage of the battery 20 or the high-voltage circuit 9), and outputs measurement data to the PCM 13.

The DC/DC converter 50 has a second voltmeter 51, a load resistor 52, an output capacitor 53, a step-down circuit 54, and a transformer 55. Similar to the inverter 40, the DC/DC converter 50 is provided with: a second positive electrode side main wire 56 that is connected to the positive electrode side of the high-voltage circuit 9; and a second negative electrode side main wire 57 that is connected to the negative electrode side of the high-voltage circuit 9.

The second voltmeter 51, the load resistor 52, the output capacitor 53, the step-down circuit 54, and the transformer 55 are connected in parallel between these second positive electrode side main wire 56 and second negative electrode side main wire 57. In detail, the second voltmeter 51, the load resistor 52, the output capacitor 53, the step-down circuit 54, and the transformer 55 are arranged in this order from an input side toward an output side of the DC/DC converter 50. The step-down circuit 54 is connected to the low-voltage circuit 10 via the transformer 55.

The actuation of the DC/DC converter 50 is controlled by the PCM 13. More specifically, in the on state of the main power supply of the automobile 1, the PCM 13 controls the step-down circuit 54 according to the driving state of the automobile 1. In this way, the DC/DC converter 50 steps down the DC power that is input from the high-voltage circuit 9, and outputs the stepped-down DC power to the low-voltage circuit 10.

The second voltmeter 51 measures a voltage between the second positive electrode side main wire 56 and the second negative electrode side main wire 57 (corresponding to the voltage of the battery 20 or the high-voltage circuit 9), and outputs measurement data to the PCM 13.

<Forced Discharge Control by PCM 13>

Figure 3:
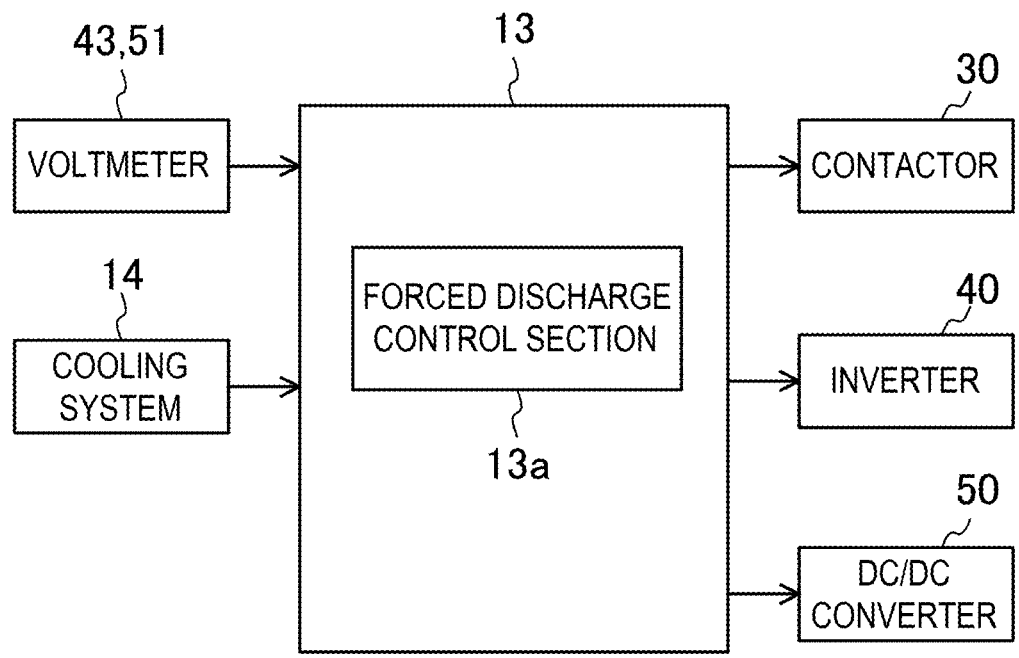
FIG. 3 is a block diagram of a PCM that is related to forced discharge control and main peripheral devices thereof.

FIG. 3 is a block diagram of the PCM 13 that is related to forced discharge control and main peripheral devices thereof. In relation to the forced discharge control, the PCM 13 inputs/outputs a signal from/to the voltmeters 43 and 51, the cooling system 14, the inverter 40, the contactor the DC/DC converter 50, and the like. The forced discharge control system in the disclosed technique is configured to include these electrical devices.

The PCM 13 is provided with a forced discharge control section 13a as a functional component. The forced discharge control section 13a outputs a control signal to the inverter 40, the contactor 30, the DC/DC converter 50, and the like on the basis of the signal input from the voltmeter 43, the cooling system 14, and the like. The PCM 13 thereby executes control to effectively and forcibly discharge the residual electric charges of the smoothing capacitor 42 in a short time.

More specifically, the PCM 13 executes the forced discharge control (combined forced discharge control) that combines the forced discharge control using the DC/DC converter 50 (first discharge control) and the forced discharge control using the active discharge circuit 61 of the inverter 40 (second discharge control). In this way, this forced discharge control system is configured to be able to effectively and forcibly discharge the residual electric charges of the smoothing capacitor 42 in the short time.

More specifically, when a specified forced discharge condition for forcibly discharging the smoothing capacitor 42 is satisfied, in a state where the battery 20 is disconnected from the high-voltage circuit 9 by control of the contactor 30, control (the first discharge control) is initiated to consume the electric charges stored in the smoothing capacitor 42 by the in-vehicle component 12 via the DC/DC converter 50.

Thereafter, when the voltage of the smoothing capacitor 42 is reduced and reaches a specified threshold, control (the second discharge control) is executed to forcibly discharge the electric charges of the smoothing capacitor 42 in the active discharge circuit 61 by control of the switch 61b.

The main resistor 61a in the active discharge circuit 61 has the low resistance value. Thus, when being discharged by the main resistor 61a, the residual electric charges of the smoothing capacitor 42 are promptly reduced, and the voltage of the smoothing capacitor 42 can be reduced in the short time. However, in such a case, since the large current flows through the main resistor 61a, the main resistor 61a generates the heat, and a temperature thereof is increased rapidly. When the temperature of the main resistor 61a is increased to a specified temperature or higher, the main resistor 61a is damaged. Thus, in reality, an amount of the electric charges that can be discharged by the main resistor 61a at once is limited.

For this reason, in order to promptly discharge the residual electric charges of the smoothing capacitor 42, it is necessary to reduce the discharge amount by the main resistor 61a. Here, the sub-resistor 62a has the high resistance value. Thus, although the electric charges can be discharged by the passive discharge circuit 62, the discharge amount thereof per unit time is small (it takes a long time for the discharge).

Meanwhile, in this automobile 1, the DC/DC converter 50 is connected to the high-voltage circuit 9. In the case where the residual electric charges of the smoothing capacitor 42 are supplied to the DC/DC converter 50 through the high-voltage circuit 9, the residual electric charges can be consumed by the in-vehicle component 12 via the DC/DC converter 50.

Accordingly, when the forced discharge using the DC/DC converter 50 and the forced discharge using the active discharge circuit 61 are executed concurrently, it is possible to effectively reduce the residual electric charges of the smoothing capacitor 42, and it is thus possible to reduce the voltage of the smoothing capacitor 42 in the short time.

(Time Chart of Combined Forced Discharge Control in Normal Time)

Figure 4:
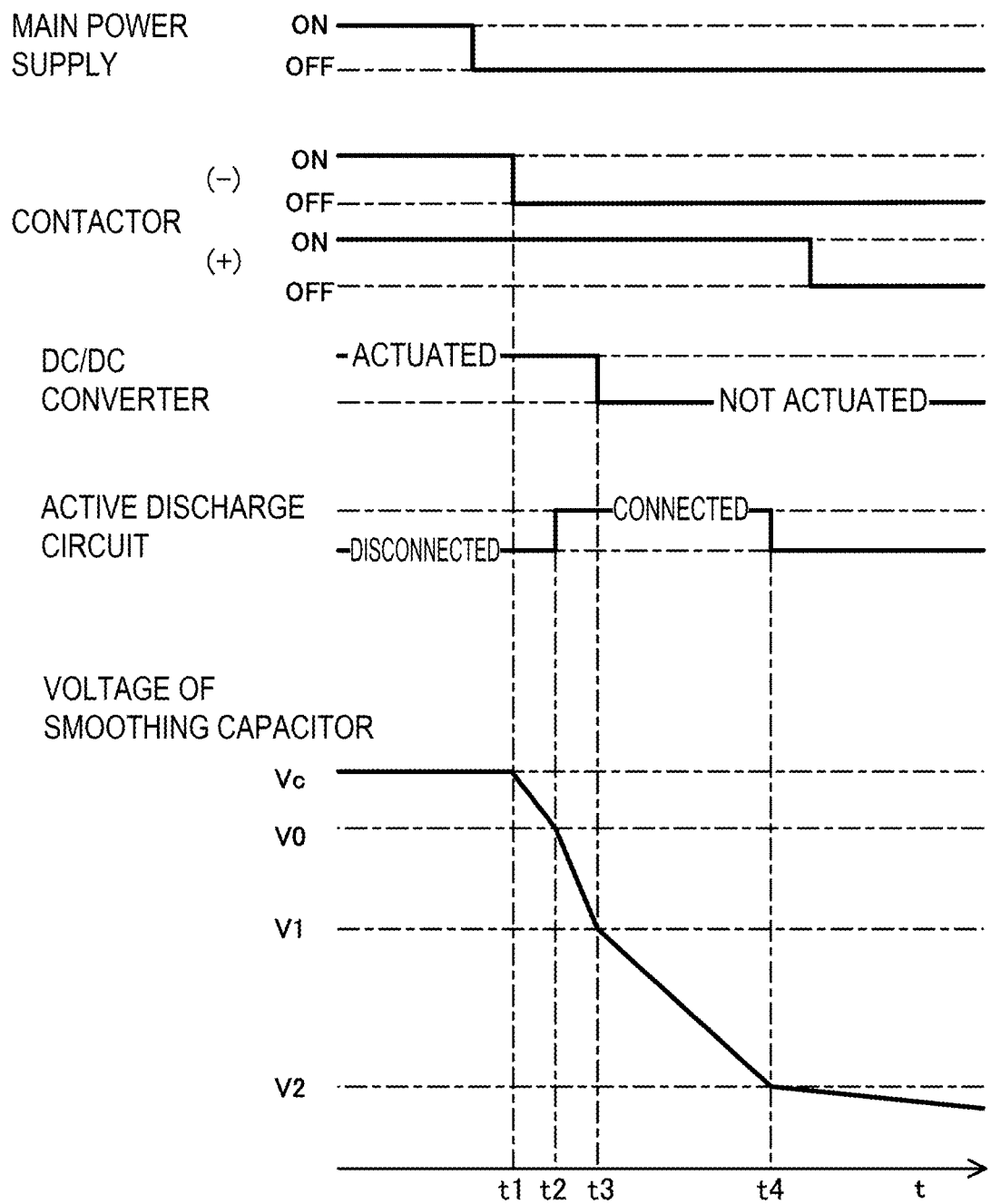
FIG. 4 is an example of a time chart of combined forced discharge control in a normal time.

FIG. 4 exemplifies a time chart of the combined forced discharge control in the normal time. A voltage change of the smoothing capacitor 42 is highlighted for ease of understanding.

In the on state of the main power supply of the automobile 1, the main contactor 31 is on. The battery 20 is connected to the high-voltage circuit 9, and the electric power is supplied from the battery 20 to the inverter 40 and the DC/DC converter 50. The DC/DC converter 50 is actuated. Thus, the smoothing capacitor 42 stores the electric charges that correspond to a voltage Vc of the battery 20. At this time, the switch 61b of the active discharge circuit 61 is disconnected.

Then, when the main power supply of the automobile 1 is turned off, the PCM 13 turns off the negative electrode contactor 31b in an interlocking manner therewith (at timing t1). Consequently, the battery 20 is disconnected from the high-voltage circuit 9. The electric power is no longer supplied from the battery 20 to the high-voltage circuit 9. At this time, an on state of the positive electrode contactor 31a is maintained. Thereafter, the positive electrode contactor 31a is turned off after a lapse of a specified time. By using such a time difference, a failure diagnosis of the contactor 30 is made.

The PCM 13 determines that the forced discharge condition is satisfied, and initiates the first discharge control. In other words, the DC/DC converter 50 can be actuated until the voltage of the smoothing capacitor 42 reaches an actuation limit voltage V1 (for example, 190 V). The PCM 13 controls the DC/DC converter 50 to allow the actuation thereof even after the main power supply is turned off.

As a result, the electric charges of the smoothing capacitor 42 are consumed by the in-vehicle component 12, and the voltage of the smoothing capacitor 42 starts to be reduced.

Thereafter, when the voltage of the smoothing capacitor 42 is reduced and reaches a specified threshold (V0, for example, 275 V) (at timing t2), the PCM 13 executes the second discharge control. More specifically, the switch 61b is turned on, and the forced discharge is initiated in the active discharge circuit 61.

The threshold V0 is higher than the actuation limit voltage V1. Here, the threshold V0 is a voltage at which the damage to the main resistor 61a can be avoided even in the case where the electric charges are continuously discharged by the main resistor 61a until the voltage of the smoothing capacitor 42 reaches a specified target voltage (a voltage V2 at which the forced discharge is no longer necessary, for example, 15 V). The threshold V0 is set in the PCM 13 in advance on the basis of an experiment or the like.

In this way, the forced discharge using the DC/DC converter 50 and the forced discharge using the active discharge circuit 61 are executed concurrently. As a result, the discharge of the smoothing capacitor 42 is promoted, and the voltage of the smoothing capacitor 42 is further reduced.

Then, when the voltage of the smoothing capacitor 42 reaches the actuation limit voltage V1 (at timing t3), the DC/DC converter 50 is no longer actuated. Thus, the first discharge control is terminated. Since the forced discharge using the DC/DC converter 50 is executed to the limit, it is possible to reduce a burden of the forced discharge by the active discharge circuit 61.

Then, when the voltage of the smoothing capacitor 42 reaches the target voltage V2, the PCM 13 turns off the switch 61b and terminates the second discharge control (at timing t4). Thereafter, the electric charges of the smoothing capacitor 42 are slowly discharged over time by the passive discharge circuit 62.

Just as described, it is possible to effectively reduce the residual electric charges of the smoothing capacitor 42 by concurrently executing the forced discharge using the DC/DC converter 50 and the forced discharge using the active discharge circuit 61. Therefore, it is possible to reduce the voltage of the smoothing capacitor 42 in the short time without damaging the active discharge circuit 61.

(Flowchart of Combined Forced Discharge Control in Normal Time)

Figure 5:
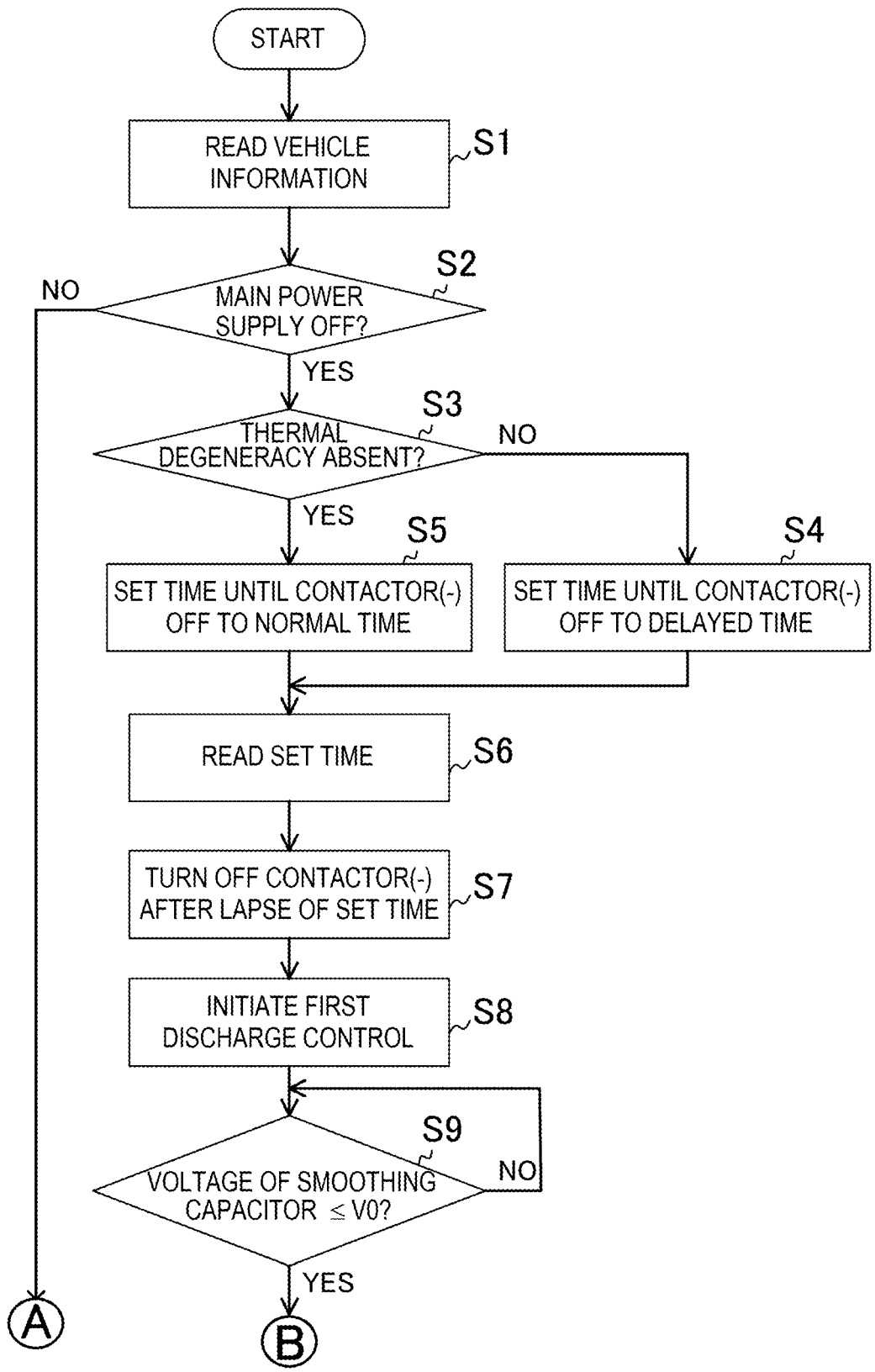
FIG. 5 is an example of a flowchart of the combined forced discharge control corresponding to FIG. 4.
Figure 6:
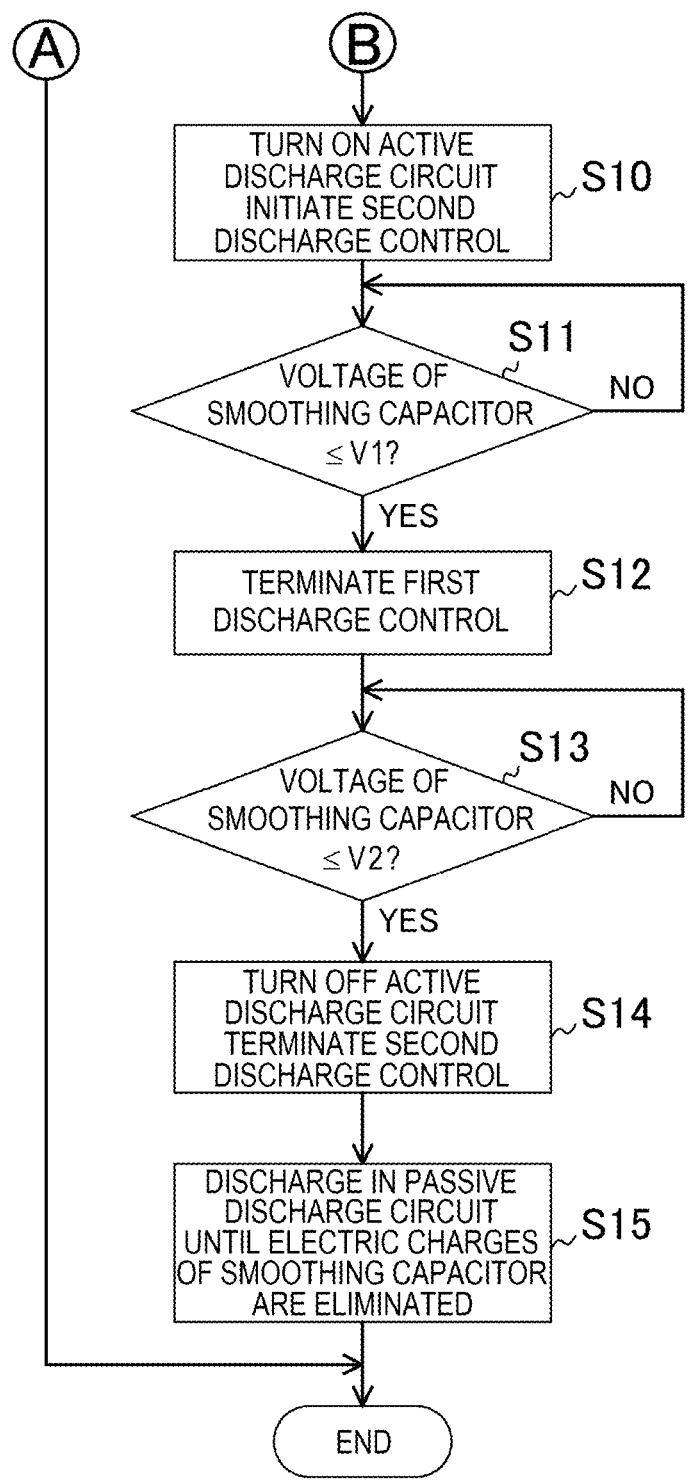
FIG. 6 is a flowchart following FIG. 5.

FIG. 5 and FIG. 6 illustrate an example of a flowchart of the combined forced discharge control corresponding to FIG. 4.

The PCM 13 reads the measurement data that is input from the voltmeter 43 and the like (step S1). When the main power supply is turned off (step S2), the PCM 13 determines presence or absence of thermal degeneracy, which will be described below (step S3). As a result, if it is determined that the thermal degeneracy is present (No in step S3), the PCM 13 sets a time until turning off of the negative electrode contactor 31b to a delayed time (step S4). On the other hand, if it is determined that the thermal degeneracy is absent (Yes in step S3), the PCM 13 sets the time until turning off of the negative electrode contactor 31b to a normal time (step S5).

Then, the PCM 13 reads the set time (step S6), and turns off the negative electrode contactor 31b after a lapse of the time (step S7, at the timing t1 in FIG. 4). Thereafter, the PCM 13 keeps the actuation of the DC/DC converter 50 and initiates the first discharge control (step S8).

The PCM 13 determines whether the voltage of the smoothing capacitor 42 has been reduced and reached the threshold V0 (step S9). Then, if it is determined that the voltage of the smoothing capacitor 42 has reached the threshold V0 (Yes in step S9), the PCM 13 turns on the switch 61b and initiates the forced discharge in the active discharge circuit 61, that is, the second discharge control (step S10).

Thereafter, the PCM 13 determines whether the voltage of the smoothing capacitor 42 has been further reduced and reached the actuation limit voltage V1 (step S11). If it is determined that the voltage of the smoothing capacitor 42 has reached the actuation limit voltage V1 (Yes in step S11), the PCM 13 stops the actuation of the DC/DC converter 50 and terminates the first discharge control (step S12).

Next, the PCM 13 determines whether the voltage of the smoothing capacitor 42 has been further reduced and reached the target voltage V2 (step S13). If it is determined that the voltage of the smoothing capacitor 42 has reached the target voltage V2 (Yes in step S13), the PCM 13 turns off the switch 61b and terminates the second discharge control (step S14). Thereafter, the electric charges are discharged in the passive discharge circuit 62 until the electric charges of the smoothing capacitor 42 are eliminated (step S15).

<Thermal Degeneracy>

As described above, the DC/DC converter 50 is no longer actuated when the voltage of the smoothing capacitor 42 becomes the actuation limit voltage or lower. Thus, the forced discharge thereafter is executed only in the active discharge circuit 61.

Thus, even when the DC/DC converter 50 is used, the main resistor 61a generates the heat, and the temperature thereof is increased. According to an experimental result by the present inventors, even when the threshold V0 is set to a desired value, the single forced discharge does not damage the main resistor 61a.

However, when the temperature of the main resistor 61a becomes high, it takes time until the temperature thereof returns to an ambient temperature. Accordingly, when the forced discharge is repeated in the short time, the heat is accumulated in the main resistor 61a. When the forced discharge is initiated in a high-temperature state, the main resistor 61a is damaged even with the normal discharge amount.

To handle such a problem, this forced discharge control system is configured that, when such short-time forced discharge is repeated, the main resistor 61a is thermally degenerated in order to suppress the damage thereto.

More specifically, in the case where the forced discharge condition is satisfied again before the lapse of the specified time, and the forced discharge occurs continuously in the short time (continuous forced discharge), the PCM 13 executes the second discharge control, that is, control to delay execution timing of the forced discharge (delay control) by the active discharge circuit 61.

When the execution timing of the forced discharge by the active discharge circuit 61 is delayed, the temperature of the main resistor 61a can be reduced during the delay time. Duration of the delay time is adjusted according to a cause of the thermal degeneracy.

(Specific Example of Thermal Degeneracy)

Figure 7:
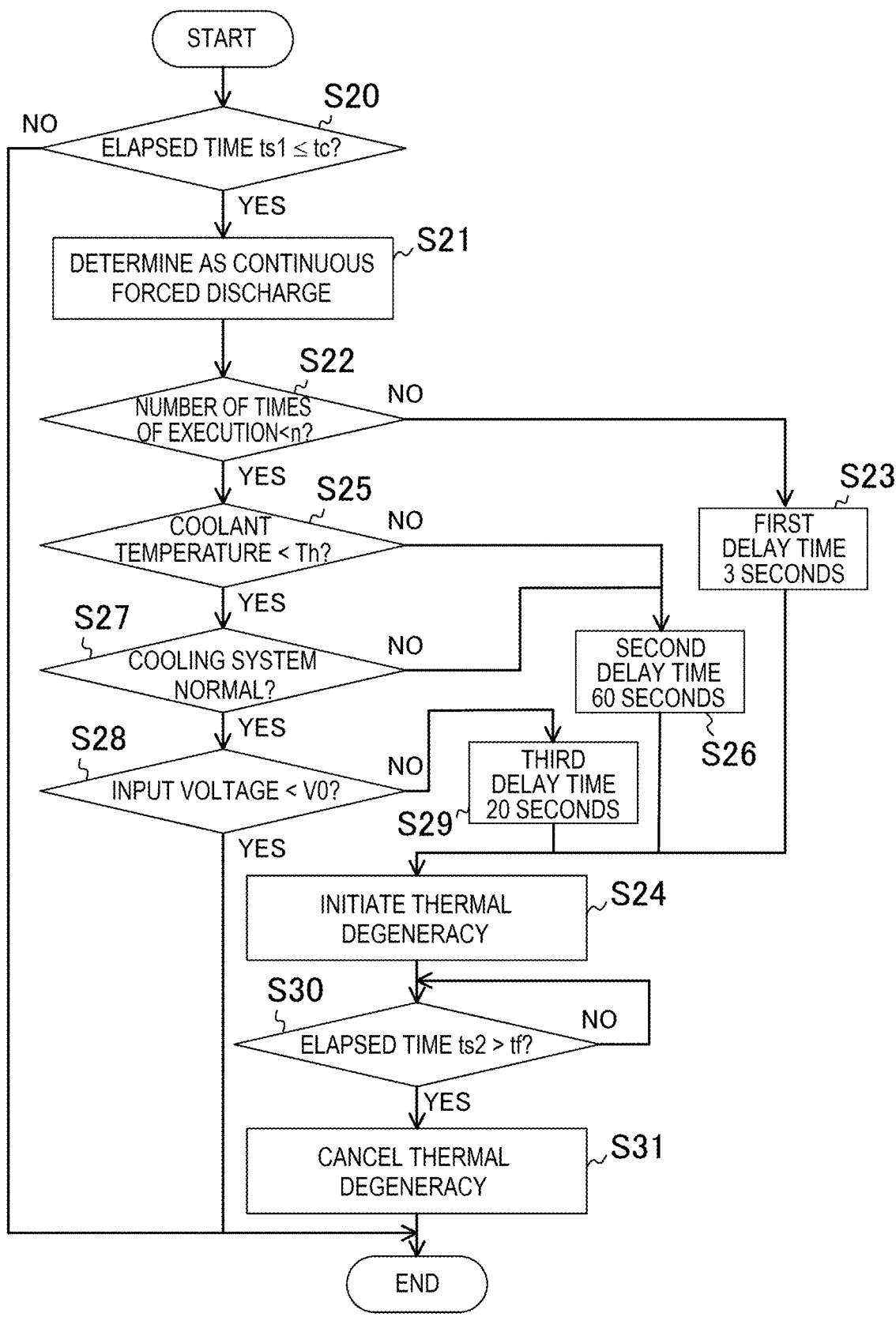
FIG. 7 is a flowchart of control related to thermal degeneracy.
Figure 8:
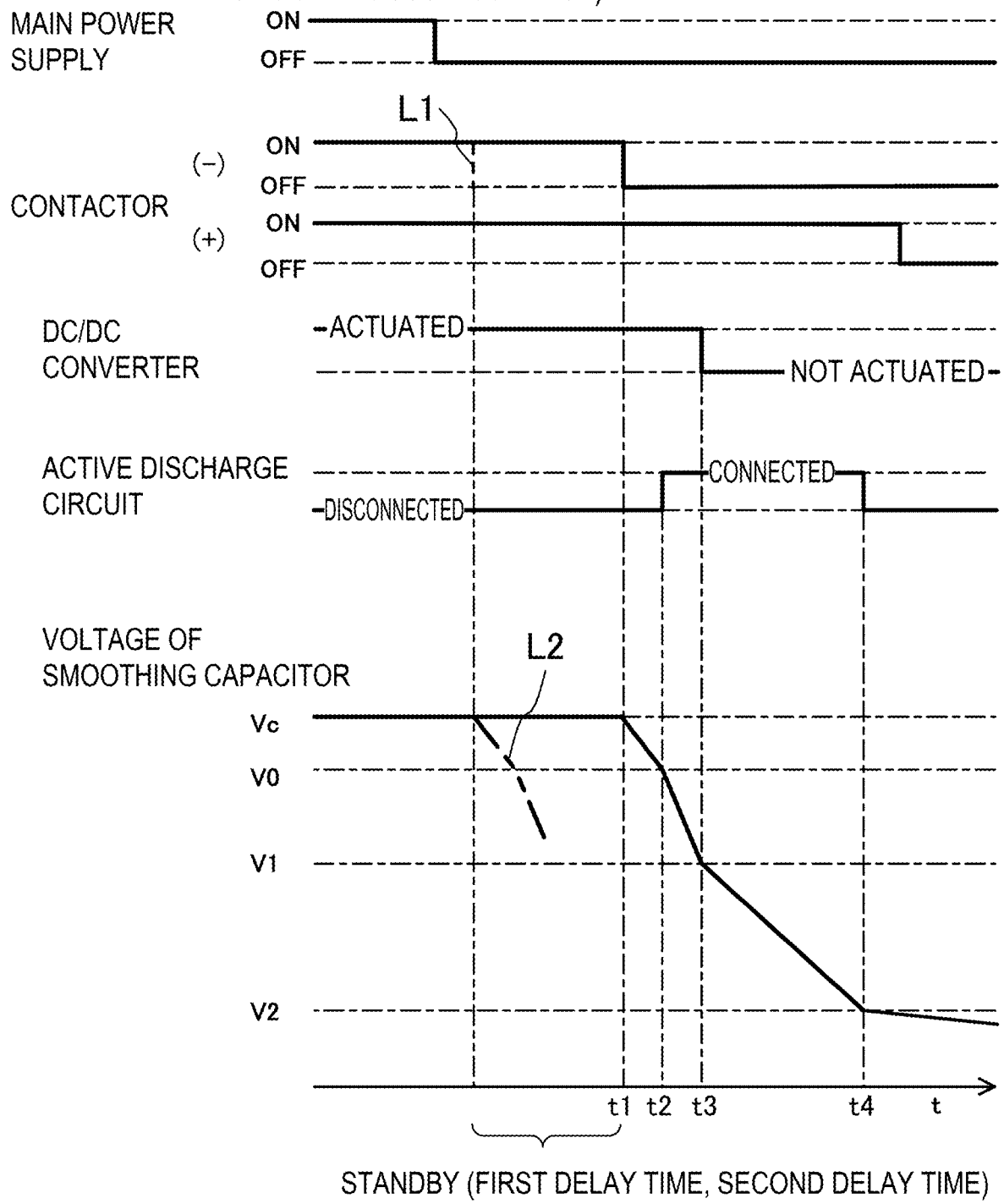
FIG. 8 is an example of a time chart of the combined forced discharge control during the thermal degeneracy.
Figure 9:
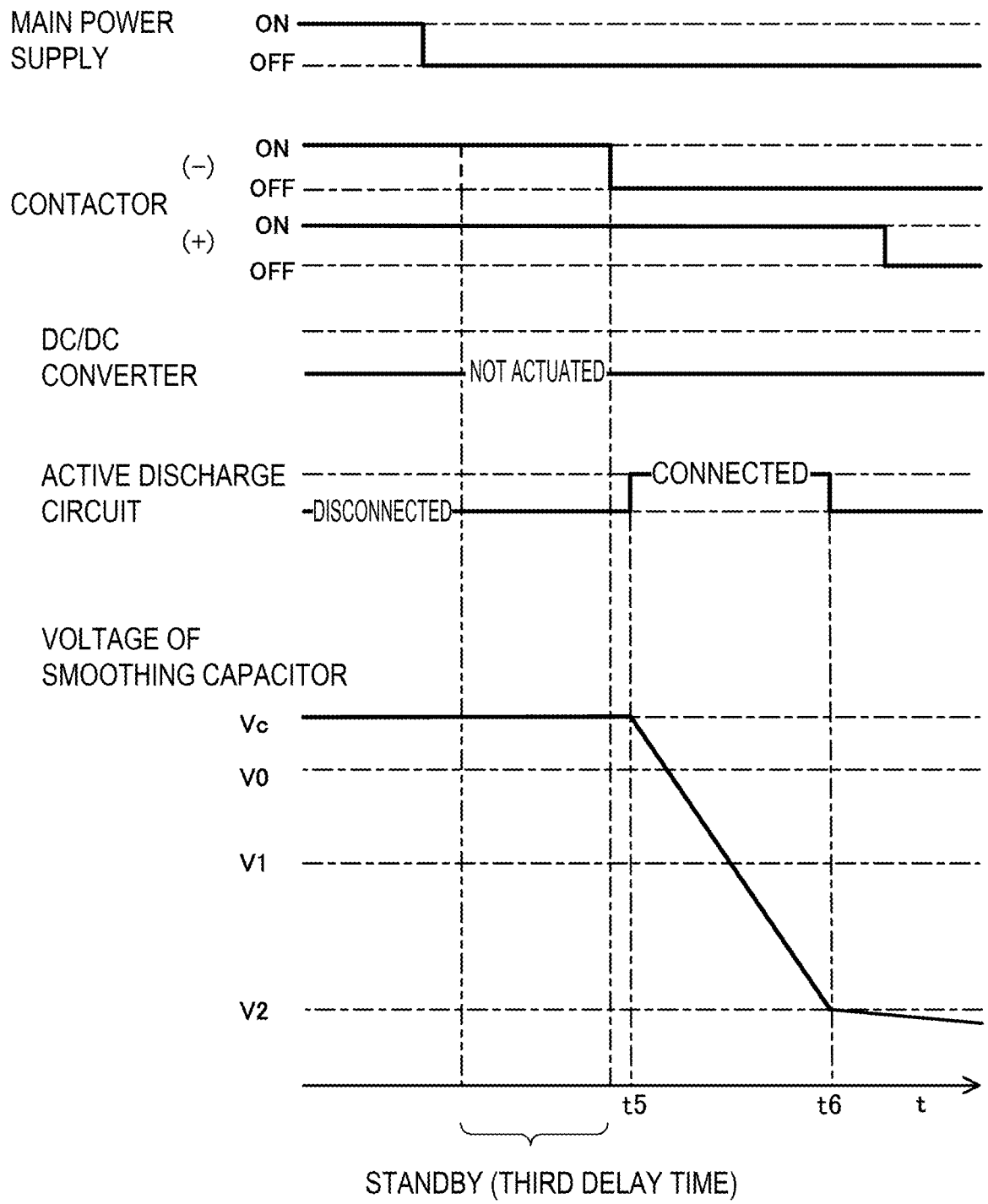
FIG. 9 is an example of a time chart of the combined forced discharge control during the thermal degeneracy.

FIG. 7 illustrates a flowchart of the control related to the thermal degeneracy. FIG. 8 and FIG. 9 illustrate time charts of the combined forced discharge control, which corresponds to FIG. 4, during the thermal degeneracy by cause.

The forced discharge control system is requested to appropriately function even in the event of abnormality. For example, there is a case where the voltage of the inverter 40 is hardly reduced due to failure of the DC/DC converter 50. Also, in such a case, the smoothing capacitor 42 has to be appropriately and forcibly discharged.

There is also a case where the temperature of the inverter 40 is excessively increased due to abnormality of the cooling system 14. Also, in such a case, the smoothing capacitor 42 has to be appropriately and forcibly discharged. The forced discharge control system is configured to allow the appropriate thermal degeneracy even in these cases.

By reading the measurement data, the PCM 13 constantly monitors the input voltages of the inverter 40 and the DC/DC converter 50 on the basis of the measurement data input from the voltmeters 43 and 51. The PCM 13 also constantly monitors a temperature of the coolant flowing through the inverter 40 and operation of the cooling system 14 on the basis of the measurement data input from the cooling system 14.

Then, when the forced discharge condition is satisfied and the execution of the forced discharge control of the smoothing capacitor 42 is necessary, the PCM 13 determines whether to initiate the thermal degeneracy (step S3 in FIG. 5).

In other words, the PCM 13 determines an elapsed time ts1 since the last forced discharge. More specifically, the PCM 13 determines whether the elapsed time ts1 since the termination of the last forced discharge by the active discharge circuit 61 exceeds a specified time (a continuous forced discharge determination time tc, for example, 20 seconds) (step S20).

As a result, if the elapsed time ts1 falls within the continuous forced discharge determination time tc (Yes in step S20), the PCM 13 determines that such forced discharge corresponds to the continuous forced discharge (step S21). On the other hand, if the elapsed time ts1 does not fall within the continuous forced discharge determination time tc, the PCM 13 determines that such forced discharge does not correspond to the continuous forced discharge (No in step S20), and executes the normal combined forced discharge control (step S5 onward in FIG. 5).

(Plural Times of Continuous Discharge)

In the case where the PCM 13 determines that the forced discharge corresponds to the continuous forced discharge, the PCM 13 determines whether the continuous forced discharge repeatedly occurs specified number of times or more (step S22).

Based on the experiment or the like, an upper limit value n (for example, three times) of the number of times that the damage to the main resistor 61*a* can be suppressed is set in the PCM 13. If the PCM 13 determines that the continuous forced discharge repeatedly occurs n times or more (No in step S22), the PCM 13 sets a specified delay time (a first delay time, for example, three seconds) (step S23), and initiates the thermal degeneracy (step S24).

When the continuous forced discharge repeatedly occurs, the heat is accumulated in the main resistor 61*a* according to the number of times thereof. Thus, as the number of times is increased, the temperature of the main resistor 61*a* at the initiation of the forced discharge is increased. In other words, prior to the execution of the forced discharge, the temperature of the main resistor 61*a* becomes higher than that in the normal time. Accordingly, as indicated by a two-dot chain line L2 in FIG. 8, the main resistor 61*a* is possibly damaged when the first discharge control and the second discharge control are executed in a similar manner to the normal time.

For this reason, in such a case, as indicated by a broken line L1 in FIG. 8, the first discharge control and the second discharge control are not executed and stand by for the set first delay time from disconnection timing of the negative electrode contactor 31*b* in the normal time, so as to delay execution timing of the first discharge control and the second discharge control.

Due to the delay, an elapsed time from the termination of the last forced discharge to the execution of the second discharge control is extended, and thus the temperature of the main resistor 61*a* can be reduced to be lower than that in the normal time. Therefore, even in the case where the temperature of the main resistor 61*a* at the initiation of the forced discharge is higher than that in the normal time, it is possible to suppress the damage to the main resistor 61*a*.

(Abnormality of Cooling System 14)

When determining that the forced discharge corresponds to the continuous forced discharge, the PCM 13 also determines the temperature of the coolant in the inverter 40 (step S25). More specifically, the PCM 13 determines whether the temperature of the coolant in the inverter 40 is lower than a specified coolant upper limit value Th.

As a result, if the PCM 13 determines that the temperature of the coolant in the inverter 40 is the specified coolant upper limit value Th or higher (No in step S25), the PCM 13 sets a specified delay time (a second delay time, for example, 60 seconds) (step S26), and initiates the thermal degeneracy (step S24).

In other words, since the inverter 40 is cooled insufficiently, the temperature of the main resistor 61*a* is also higher than that in the normal time. Accordingly, as indicated by the two-dot chain line L2 in FIG. 8, the main resistor 61*a* is possibly damaged when the first discharge control and the second discharge control are executed in the similar manner to the normal time.

Thus, in such a case, as illustrated in FIG. 8, the first discharge control and the second discharge control are not executed and stand by for the set second delay time from the disconnection timing of the negative electrode contactor 31*b* in the normal time, so as to delay the execution timing of the first discharge control and the second discharge control.

Due to the delay, the elapsed time from the termination of the last forced discharge to the execution of the second discharge control is extended, and thus the temperature of the main resistor 61*a* can be reduced to be lower than that in the normal time. Therefore, even in the case where the temperature of the main resistor 61*a* at the initiation of the forced discharge is higher than that in the normal time, it is possible to suppress the damage to the main resistor 61*a*.

The PCM 13 also determines whether the cooling system 14 is abnormal (step S27). For example, in the case where the coolant passage 14*b* is broken and leaks the coolant, the temperature of the inverter 40 is increased. The PCM 13 detects the abnormality of the cooling system 14 from an energized state of the electric pump 14*a*. Also, in this case, the PCM 13 sets the specified delay time (the second delay time, for example, 60 seconds) (step S26), and initiates the thermal degeneracy (step S24).

(Abnormality of DC/DC Converter 50)

There is a case where the DC/DC converter 50 is not actuated due to a certain trouble such as a collision of the automobile 1. In such a case, even when the first discharge control is executed, the voltage of the inverter 40 (the smoothing capacitor 42) is hardly reduced and does not reach the threshold V0.

Thus, in such a case, the PCM 13 detects abnormality of the DC/DC converter 50 in the immediately preceding forced discharge. More specifically, at specified timing (the timing t2 in FIG. 4) after turning off of the negative electrode contactor 31*b*, the PCM 13 determines whether the voltage of the smoothing capacitor 42 has become lower than the threshold V0 on the basis of the measurement data by the voltmeter 43 (step S28).

As a result, if the PCM 13 determines that the input voltage of the inverter 40 has not become lower than the threshold V0 (No in step S28), the PCM 13 determines that the input voltage of the inverter 40 is not reduced in the current forced discharge, either. Consequently, the PCM 13 sets the specified delay time (a third delay time, for example, 20 seconds) (step S29), and initiates the thermal degeneracy (step S24).

In this case, as illustrated in FIG. 9, the DC/DC converter 50 is not actuated. Even when the first discharge control is executed, the voltage of the smoothing capacitor 42 is hardly reduced. Thus, as illustrated in FIG. 9, the second discharge control is executed after the second discharge control stands by until a lapse of the third delay time from the disconnection timing of the negative electrode contactor 31*b* in the normal time.

Figure 10:
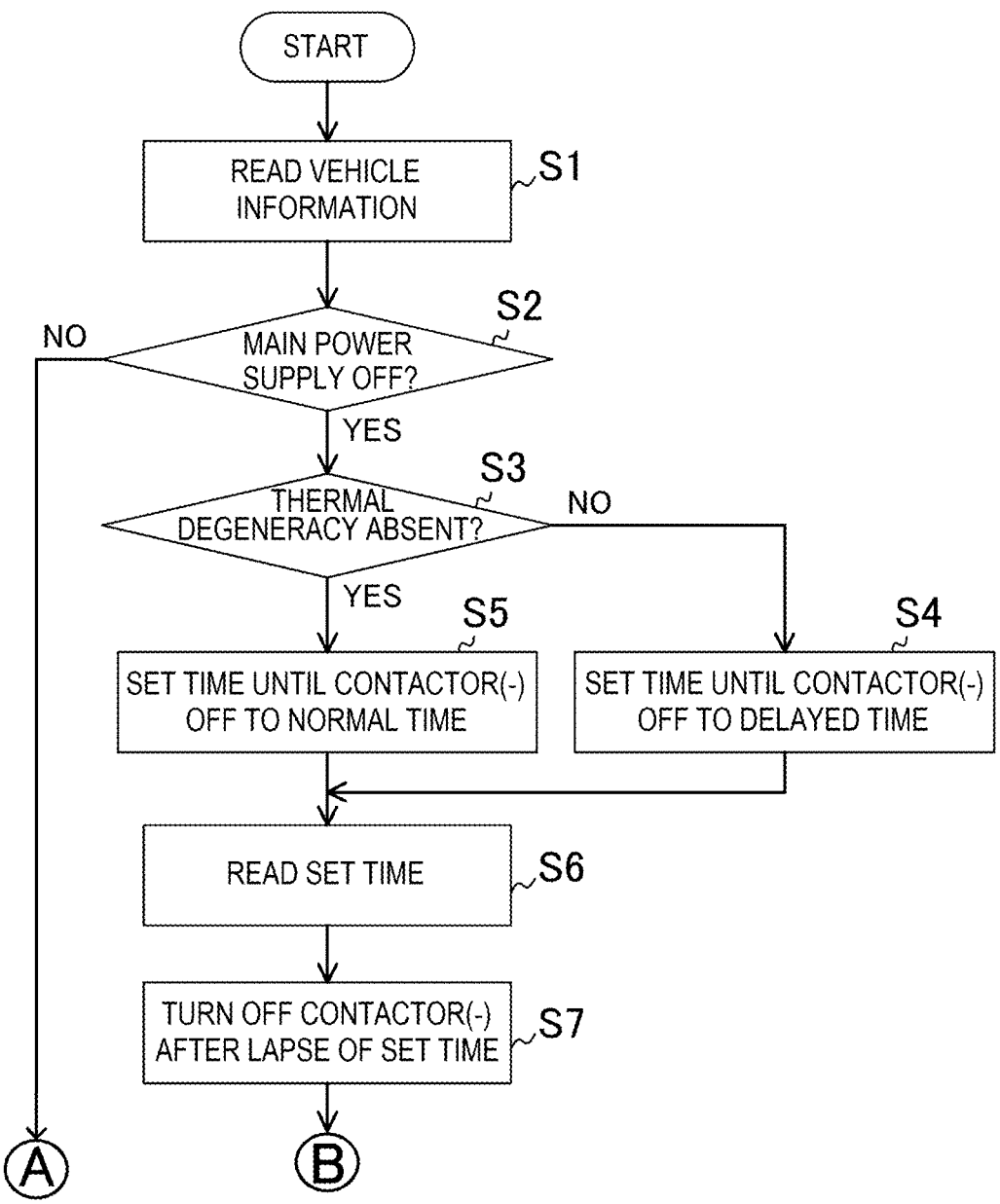
FIG. 10 is an example of a flowchart at the time when a DC/DC converter is abnormal.
Figure 11:
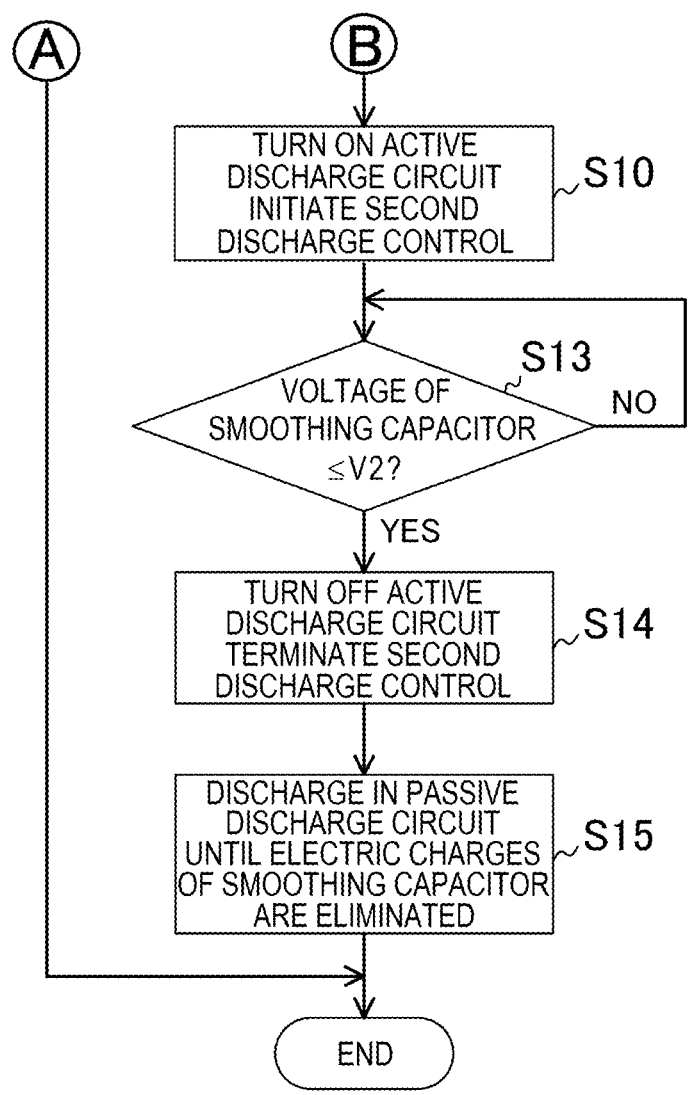
FIG. 11 is a flowchart following FIG. 10.

FIG. 10 and FIG. 11 illustrate a flowchart at the time when the DC/DC converter 50 is abnormal. In this case, the PCM 13 executes processing in a manner to skip step S8 and step S9 in the flowchart illustrated in FIG. 5 as well as step S11 and step S12 in the flowchart illustrated in FIG. 6. Since the rest of the processing is the same as that in the above flowchart, the processing with the same contents will be denoted by the same reference sign and numeral, and the detailed description thereon will not be made.

After the thermal degeneracy stands by and the third delay time elapses, the PCM 13 turns off the negative electrode contactor 31*b* (step S7). Thereafter, the PCM 13 turns on the switch 61*b* at specified timing (at the timing t5 in FIG. 9) and initiates the forced discharge in the active discharge circuit 61, that is, the second discharge control (step S10). As a result, the electric charges of the smoothing capacitor 42 are reduced, and the voltage of the smoothing capacitor 42 is reduced.

Thereafter, the PCM 13 determines whether the voltage of the smoothing capacitor 42 has been reduced and reached the target voltage V2 (step S13). Then, if it is determined that the voltage of the smoothing capacitor 42 has reached the target voltage V2 (at timing t6 in FIG. 9), the PCM 13 turns off the switch 61b and terminates the second discharge control (step S14). Thereafter, the electric charges are discharged in the passive discharge circuit 62 until the electric charges of the smoothing capacitor 42 are eliminated (step S15).

Of the delay times, the first delay time is the shortest, and the second delay time is the longest. The third delay time is shorter than the second delay time and longer than the first delay time. These are based on the cause of the thermal degeneracy.

(Cancellation of Thermal Degeneracy)

After the thermal degeneracy is initiated, the PCM 13 cancels the thermal degeneracy at the time when a specified condition is satisfied.

That is, as illustrated in FIG. 7, the PCM 13 determines an elapsed time ts2 since the last forced discharge. More specifically, the PCM 13 determines whether the elapsed time ts2 since the termination of the immediately preceding forced discharge exceeds a specified time (a degeneracy cancellation determination time tf, for example, five minutes) (step S30).

As a result, if the elapsed time ts2 exceeds the degeneracy cancellation determination time tf (Yes in step S30), the PCM 13 cancels the thermal degeneracy (step S31).

Just as described, according to this forced discharge control system, the smoothing capacitor 42 can effectively and forcibly be discharged in the short time. In addition, it is possible to avoid the damage to the main resistor 61a, in other words, failure of an electronic board provided to the inverter 40. Therefore, it is possible to improve reliability of the forced discharge control system.

The disclosed technique is not limited to the above-described embodiment and includes various configurations other than that described in the above-described embodiment. For example, in the above-described embodiment, the description has been made on the application example to the hybrid vehicle. However, the disclosed technique can also be applied to the electric vehicle that is driven only by the motor. The controller is not limited to the PCM. A dedicated device for this purpose may be used, separately.

DESCRIPTION OF REFERENCE SIGNS AND NUMERALS

1 Automobile (vehicle)
2 Engine
33 Drive motor
4 Automatic transmission
9 High-voltage circuit
10 Low-voltage circuit
12 In-vehicle component (low-voltage component)
13 PCM (controller)
   13a Forced discharge control section
14 Cooling system (cooling mechanism)
20 Battery
30 Contactor
31 Main contactor (power supply switching means)
   31a Positive electrode contactor
   31b Negative electrode contactor
40 Inverter
42 Smoothing capacitor
50 DC/DC converter (step-down converter)
60 Forced discharge circuit
61 Active discharge circuit
   61a Main resistor
   61b Switch (energization switching means)
62 Passive discharge circuit
   62a Sub-resistor

The invention claimed is:

1. A forced discharge control system for a smoothing capacitor, the forced discharge control system comprising:
a drive battery that is mounted on a vehicle;
an inverter that includes the smoothing capacitor and a forced discharge circuit, the inverter controls electric power supplied from the battery, and outputs the controlled electric power to a drive motor;
at least one in-vehicle low-voltage component connected to a low-voltage circuit;
a step-down converter that steps down a voltage of the battery and supplies the stepped-down voltage to the at least one in-vehicle low-voltage component;
a high-voltage circuit that electrically connects the battery, the inverter, and the step-down converter; and
a power supply switch configured to switch the battery to a state of being connected to the high-voltage circuit or a state of being disconnected from the high-voltage circuit,
the forced discharge circuit having an active discharge circuit that includes a main resistor and an energization switch, the main resistor being arranged in parallel with the smoothing capacitor, and the energization switch configured to switch the main resistor to a state of being connected to the high-voltage circuit or a state of being disconnected from the high-voltage circuit,
the forced discharge control system further comprising:
a controller that controls the step-down converter, the power supply switch, and the energization switch, wherein
the controller initiates first discharge control when a specified forced discharge condition for forcibly discharging the smoothing capacitor is satisfied, and thereafter executes second discharge control when a voltage of the smoothing capacitor is reduced and reaches a specified threshold, in the first discharge control, electric charges that are stored in the smoothing capacitor being consumed by the at least one low-voltage component via the step-down converter in a state where the battery is disconnected from the high-voltage circuit by control by the power supply switch, and in the second discharge control, the electric charges of the smoothing capacitor are forcibly discharged in the active discharge circuit by control by the energization switch, and
the controller executes delay control to delay execution timing of the second discharge control in a case where a forced discharge, in which the forced discharge condition is satisfied, occurs within a specified time since a last forced discharge.

2. The forced discharge control system for the smoothing capacitor according to claim 1, wherein
the delay control is executed in the case where the continuous forced discharge repeatedly occurs a specified number of times or more.

3. The forced discharge control system for the smoothing capacitor according to claim 2, wherein
in a case where the controller detects abnormality of the step-down converter, the controller executes the second discharge control before the voltage of the smoothing capacitor reaches the threshold.

4. The forced discharge control system for the smoothing capacitor according to claim 3, wherein
the inverter further includes a cooling mechanism that cools the inverter by circulating a coolant, and
the controller executes the delay control in a case where a temperature of the coolant exceeds a specified upper limit value or in a case where abnormality of the cooling mechanism is detected.

5. The forced discharge control system for the smoothing capacitor according to claim 1, wherein
the forced discharge circuit further has a passive discharge circuit that includes a sub-resistor, the sub-resistor being always connected to the smoothing capacitor and has a higher resistance value than the main resistor.

6. The forced discharge control system for the smoothing capacitor according to claim 1, wherein
the first discharge control and the second discharge control are executed concurrently by maintaining the first discharge control even after the voltage of the smoothing capacitor reaches the threshold.

7. The forced discharge control system for the smoothing capacitor according to claim 6, wherein
the step-down converter is configured to be actuated as long as a voltage of the smoothing capacitor is higher than an actuation limit voltage being lower than the threshold, and
the first discharge control is terminated when the voltage of the smoothing capacitor reaches or falls below the actuation limit voltage.

8. The forced discharge control system for the smoothing capacitor according to claim 1, wherein
an engine is installed in a front portion of the vehicle, and
in a state of being coupled to a rear portion of the engine, the drive motor is arranged in a tunnel section of a floor panel.

9. The forced discharge control system for the smoothing capacitor according to claim 1, wherein
in a case where the controller detects abnormality of the step-down converter, the controller executes the second discharge control before the voltage of the smoothing capacitor reaches the threshold.

10. The forced discharge control system for the smoothing capacitor according to claim 9, wherein
the inverter further includes a cooling mechanism that cools the inverter by circulating a coolant, and
the controller executes the delay control in a case where a temperature of the coolant exceeds a specified upper limit value or in a case where abnormality of the cooling mechanism is detected.

11. The forced discharge control system for the smoothing capacitor according to claim 2, wherein
the forced discharge circuit further has a passive discharge circuit that includes a sub-resistor, the sub-resistor being always connected to the smoothing capacitor and has a higher resistance value than the main resistor.

12. The forced discharge control system for the smoothing capacitor according to claim 2, wherein
the first discharge control and the second discharge control are executed concurrently by maintaining the first discharge control even after the voltage of the smoothing capacitor reaches the threshold.

13. The forced discharge control system for the smoothing capacitor according to claim 12, wherein
the step-down converter is configured to be actuated as long as a voltage of the smoothing capacitor is higher than an actuation limit voltage being lower than the threshold, and
the first discharge control is terminated when the voltage of the smoothing capacitor reaches or falls below the actuation limit voltage.

14. The forced discharge control system for the smoothing capacitor according to claim 2, wherein
an engine is installed in a front portion of the vehicle, and
in a state of being coupled to a rear portion of the engine, the drive motor is arranged in a tunnel section of a floor panel.

15. The forced discharge control system for the smoothing capacitor according to claim 2, wherein an engine is installed in a front portion of the vehicle.

16. The forced discharge control system for the smoothing capacitor according to claim 3, wherein the inverter further includes a cooling mechanism that cools the inverter by circulating a coolant.

17. The forced discharge control system for the smoothing capacitor according to claim 1, wherein the forced discharge circuit further has a passive discharge circuit that includes a sub-resistor.

18. The forced discharge control system for the smoothing capacitor according to claim 1, wherein the forced discharge circuit further has a passive discharge circuit that includes a sub-resistor, and the sub-resistor is always connected to the smoothing capacitor.

19. The forced discharge control system for the smoothing capacitor according to claim 6, wherein the step-down converter is configured to be actuated as long as a voltage of the smoothing capacitor is higher than an actuation limit voltage being lower than the threshold.

* * * * *